United States Patent [19]

Joseph et al.

[11] Patent Number: 5,311,001
[45] Date of Patent: May 10, 1994

[54] ANALOG WAVEFORM DECODER UTILIZING HISTOGRAM OF EDGE SIZES

[75] Inventors: Eugene B. Joseph; Theodosios Pavlidis, both of Setauket, N.Y.

[73] Assignee: Symbol Technologies, Inc., Bohemia, N.Y.

[21] Appl. No.: 96,579

[22] Filed: Jul. 23, 1993

Related U.S. Application Data

[63] Continuation of Ser. No. 759,332, Sep. 13, 1991, abandoned.

[51] Int. Cl.$^5$ .............................................. G06K 7/10
[52] U.S. Cl. ..................................... 235/462; 235/463
[58] Field of Search ................ 235/462, 454, 463, 470

[56] References Cited

U.S. PATENT DOCUMENTS

| | | | |
|---|---|---|---|
| 4,251,798 | 2/1981 | Swartz et al. | 340/146.3 |
| 4,354,101 | 10/1982 | Hester et al. | 235/463 |
| 4,360,798 | 11/1982 | Swartz et al. | 340/146.3 |
| 4,808,804 | 2/1989 | Krichever et al. | 235/462 |
| 5,010,242 | 4/1991 | Frontino | 235/462 |
| 5,059,773 | 10/1991 | Shimizu et al. | 235/463 |
| 5,073,954 | 12/1991 | Van Tyne et al. | 235/462 X |
| 5,128,527 | 7/1992 | Kawai et al. | 235/463 |
| 5,140,146 | 8/1992 | Metlisky et al. | 235/463 |

OTHER PUBLICATIONS

Pavlidis, Theodosios, et al., "Fundamentals of Bar Code Information Theory," *IEEE Computer*, Apr. 1990, pp. 74-86.
Pavlidis, Theodosios, "Algorithms for Shape Analysis of Contours and Waveforms," *IEEE Transactions on Pattern Analysis and Machine Intellegence*, Jul. 1980, Vo. PAMI-2, pp. 301-312.
Eklundh, Jan-Olof, et al., "Peak-Detection using Difference Operators," *IEEE Transactions on Pattern Analysis and Machine Intelligence*, Jul. 1979, vol. PAMI-1, pp. 317-325.
Horowitz, Steven, L., "A Syntactic Algorithm for Peak Detection in Waveforms with Applications to Cardiography," *Communications of the Associations for Computing Machinery*, May 1975, vol. 18, pp. 281-285.
Ehrich, Roger, W., et al., "Representation of Random Waveforms by Relational Trees," *IEEE Transactions on Computers*, Jul. 1976, Vo. C-25, No. 7, pp. 725-736.
Kiryati, N., et al., "Gray Levels can Improve the Performance of Bivary Image Digitizers," *CVGIP: Graphic Models and Image Processing*, Jan. 1991, vol. 53, pp. 31-39.

*Primary Examiner*—Donald Hajec
*Assistant Examiner*—Jeffrey R. Filipek

[57] ABSTRACT

A method for decoding information contained in an analog waveform representative of a bar code symbol comprising the steps of identifying a decodable portion of an analog waveform; processing said decodable portion to obtain a plurality of waveform descriptors; and performing a high and low density decoding process to one or more of said plurality of waveform descriptors for decoding information contained in either a high or low density symbol respectively, is disclosed. The high density decoder used for decoding high density symbols utilizes extrema extents, i.e., areas of the peaks and valleys of the analog waveform which directly correlate to the size of the bars/spaces of a high density bar code. After locating the seed point of the waveform, each extrema extent is generated and thresholded at each peak/valley location to decide its size. The high density decoder is adaptive in that the thresholding extent value is updated as the solution grows away from the seed point. The low density decoder used for decoding low density symbols utilizes the widths of the peaks/valleys for decoding purposes and utilizes a histogramming and backtracking technique for removing noise levels from the analog waveform. Backtracking allows another decode attempt to be made if one is unsuccessful.

38 Claims, 11 Drawing Sheets

HIGH DENSITY DECODER

ANALOG WAVEFORM DECODER UTILIZING HISTOGRAM OF EDGE SIZES

This is a continuation of application Ser. No. 07/759,332, filed Sep. 13, 1991, now abandoned.

BACKGROUND OF THE INVENTION

1. Field of the Invention

The present invention relates to laser scanning systems for reading and decoding bar code symbols or other types of symbology. Particularly, it relates to an analog waveform decoder that operates directly upon ana analog waveform representative of a bar code symbol for decoding the symbol. Still more particularly, the invention relates to an analog waveform decoder that can decode high density bar code symbols reliably and efficiently.

2. Discussion of the Prior Art

Many industries, particularly the grocery and food processing industry, have been designating their products with unique bar code symbols. A bar code usually consists of alternating stripes of two colors with the information such as a product identification number, encoded in the widths therein. Various bar code schemes have been developed and today the most widely used codes are the Universal Product Code and Code 39.

Current bar code technology is centered around a laser scanner, a hardware digitizer and decoding software. A bar code is read by analyzing the waveform produced when light from a scanning laser beam is reflected from the bar code image area, i.e., when the bar code is convolved with the point spread function of a light source—the laser. Typically, the hardware digitizer takes as input the resulting analog waveform, and produces as an output a representation of that waveform in binary signal form, i.e., a sequence of numbers describing the widths of the alternating stripes of the bar code After this is accomplished, an effort is made to decode the sequence of widths. This method is simple and works quite well when the width of the point spread function of the laser beam is small compared to the widths of the bar code. However, this system fails for high density bar code symbols, particularly because the phenomenon of convolution distortion affects the analog representation of the bar code symbol that should be, in the ideal case, a series of rectangular pulses. Other types of noise and distortions affecting the analog waveform, and hence the decodability of the bar code, exist These are introduced by paper grain noise, printing noise, dot matrix printing, and low contrast printing of the bar code symbols. All of these affect the resultant analog waveform in different ways and each can prevent the recovery of pulse widths from being a simple matter. For example, convolution distortion essentially causes an averaging out of the ideal signal and can make the pulses, as represented in the analog waveform, appear wider and more rounder than they really are. This can cause significant decoding errors even in the absence of noise.

Another major source of distortion is the ink spread. Ink spread occurs when ink deposited on the paper flows beyond the intended boundaries. Depending upon the way the bar code is printed, ink spread can effectively change the character of the bar or space, and possibly result in a misdecode. Though the sequence of the bars in a bar code are discernable to the human eye, a typical decoder must be able to discriminate differences in widths of the order of 0.01 inches. It should be stressed that the effects of this type of distortion are most significant near the edges between the bars and spaces.

Furthermore, as mentioned above, noise presents decoding problems. Dot-matrix symbol noise can add small peaks and valleys to the analog waveform representative of the bar code symbol. The size of the added peaks and valleys is related to the dot size of the printer. Other types of noise such as low frequency noise due to artificial ambient light, or shot noise due to sunlight and/or the electronics of the scanner can create additive noise and effect the sensitivity of the edges. Since additive noise corrupts the amplitude of the analog waveform, thresholds are used to decide which peaks of the waveform are significant and should be reported as binary pulses. This thresholding limits the working range and spatial resolution of the current bar code readers—especially since high density waveforms resemble noise in low density bar codes and have their waveform peaks/valleys removed or merged by the hardware digitizer.

In view of the above-mentioned limitations and disadvantages of the current bar code decoding technology, an analog waveform decoder that has an extended working range and greater resolution would be desirable. Particularly, an analog decoder which can handle increased convolution distortion and dot-matrix symbol distortion would be extremely advantageous. It is accordingly an object of the present invention to fulfill these needs by providing an analog waveform decoder that obviates the need for a hardware digitizer and operates directly upon the analog waveform. Such analog decoding may be accomplished either by direct decoding of the waveform or by deblurring the waveform to obtain a form close to the ideal input and then decode it by conventional means. In addition, it would be particularly advantageous to provide an analog waveform decoder that can effectively and efficiently decode high density bar code symbols that are in current use and one that can be adapted to decode high density symbology of the future.

SUMMARY OF THE INVENTION

The present invention is directed to an analog waveform decoder for decoding an analog waveform having an amplitude that is representative of the convolution of a bar code symbol of unknown density with a laser light source. The invention is also directed to a high density waveform decoder that can decode high density bar code symbols such as 3 mil CODE39 symbology and other high density symbology.

The analog waveform decoder of the present invention is a waveform recognition system that utilizes a single algorithm to operate directly on the analog waveform. The software that is utilized in the algorithm makes decisions about signal/noise directly from the structure of the waveform. Alternatively, the output of the recognition system can be a deblurred waveform, i.e., a waveform that approximates, as closely as possible, the original bar code—which subsequently could be decoded by estimating the widths of the bars and spaces by using a conventional decoder.

The software implemented in the analog waveform decoder of the invention first determines the boundaries of the analog waveform to identify a decodable portion of said waveform. The decodable portion is then processed to obtain a plurality of waveform descriptors that define the decodable portion of the analog waveform. A high density decoding process is then performed on one or more of the plurality of waveform descriptors for producing a first decode signal representative of information contained in a high density symbol. If this decoding process is unsuccessful, a non-decode signal is produced. A low density decoding process is then performed in response to the non-decode symbol for producing a second decode signal representative of information contained in a low density symbol. Either the first or second decode signal is output from the analog waveform decoder.

In the analog waveform decoder of the invention, the structure of the waveform is divided into two classes, each with its own model; the high and low density model. A different decoder or deblurring operation is designed for each model and both decoders are applied to each input waveform.

The high density model and decoder focuses on the waveform as represented by various waveform descriptors. The descriptors include the locations of the extrema or peaks and valleys of the waveform, their derivatives of various orders and, in the case of the deblurred waveform, combinations of such derivatives. The sizes of the extrema, the sizes of the lines joining them, and their zeros are also utilized. These waveform descriptors provide sufficient information to allow the decoding of a high density bar code.

In the low density model, the extrema locations are well defined, so the widths of the successive waveform peaks and valleys, the extrema widths, are sufficient to allow decoding of a low density bar code. The distinction between high and low density waveforms is obtained by examining statistics of the sizes and locations of the features measured in the previous paragraph. The low density decoder allows for noise extrema to be removed from the waveform before a sequence of extrema is passed into the low density decoder. By histogramming all of the edge sizes, noise level threshold values are determined, and noise can be removed from the waveform representation before each decode attempt is made.

The use of both a high density waveform representation and decoder and a low density waveform representation and decoder is necessary so that any type of bar code, of any density, can be decoded. Each model has its attendant advantages which will be described in further detail hereinbelow.

DESCRIPTION OF THE PREFERRED EMBODIMENT

Figure 1:
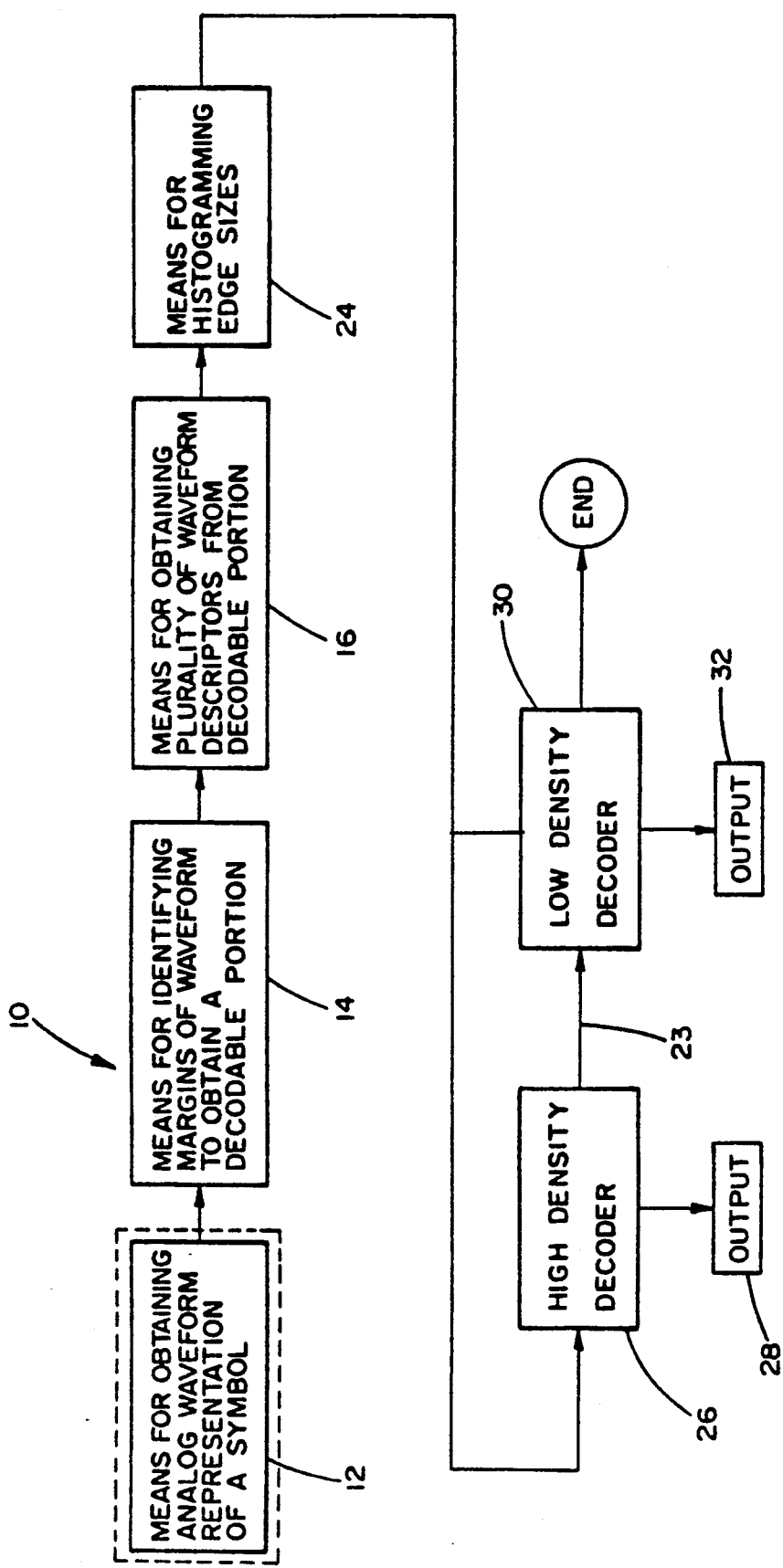
FIG. 1 is a block diagram of the analog waveform decoder of the present invention.

The analog waveform decoder of the present invention as shown in the block diagram of FIG. 1 includes stages comprising an algorithm used to decode bar code symbols. Though this description will make reference to bar code symbols only, it is understood that the analog waveform decoder can be used to decode other types of symbology. Though it is not shown in FIG. 1, a laser light source is first convolved with the bar code symbol to obtain an analog waveform. Then, means 12 in FIG. 1, which may be a photodetecting means such as element 50 of the hand-held laser scanning bar-code reader depicted in FIG. 13, receives the light reflected off the bar-code symbol and converts it into an electrical signal that is subsequently amplified and inputted to the analog waveform decoder 10 where the decoding algorithm is implemented. The algorithm, implemented by various software routines to be described below, and a digital computer or microprocessor, comprises essentially five main steps. The first step includes means 14 to identify the decodable portion of the analog waveform. Once a decodable portion is obtained, means 16 obtains a plurality of waveform descriptors representing the characteristics of the analog waveform. In the preferred embodiment of the analog waveform decoder, the waveform descriptors that are obtained include extrema locations which are the locations of the waveform peaks and valleys, edge sizes which are the sizes of the straight lines joining adjacent extrema, and inflection point triplets which are the locations where peaks and valleys merge. These waveform descriptors are primarily utilized by the high density decoder 26 for decoding a high density symbol, which will be described in detail below. Means 24 obtains a histogram of the edge sizes which is utilized by the low density decoder 30, also to be described in detail below.

It should be stressed that an analog waveform signal that is input into the analog waveform decoder 10, is representative of either a high density bar code symbol or low density bar code symbol. The algorithm at the outset does not discern which type of decoder, high or low density, is to be used because, as mentioned above, noise will make a low density symbol seem like a high density symbol. Therefore, after the waveform is preprocessed, i.e., the functions of means 12 through 24 are performed, the high density decoding step is automatically performed. If a successful decode is obtained, the algorithm is terminated. If a successful decode is not obtained, a non-decode signal 23 is generated to implement the low density decoder. Therefore, the analog waveform decoder is selective in the sense that a successful decode will be obtained from either the high density decoder or low density decoder.

The first step of the algorithm identifies the decodable portion of the waveform. This step is implemented as a software routine to find the left and right margins of the bar code. In the preferred embodiment, the software essentially finds a point within the bar code and makes a search outwards in both directions until a left and right "dead zone" is found. Once found, the margins or boundaries are then set to the last significant edge of the sequence seen before the dead zones.

Figure 8:
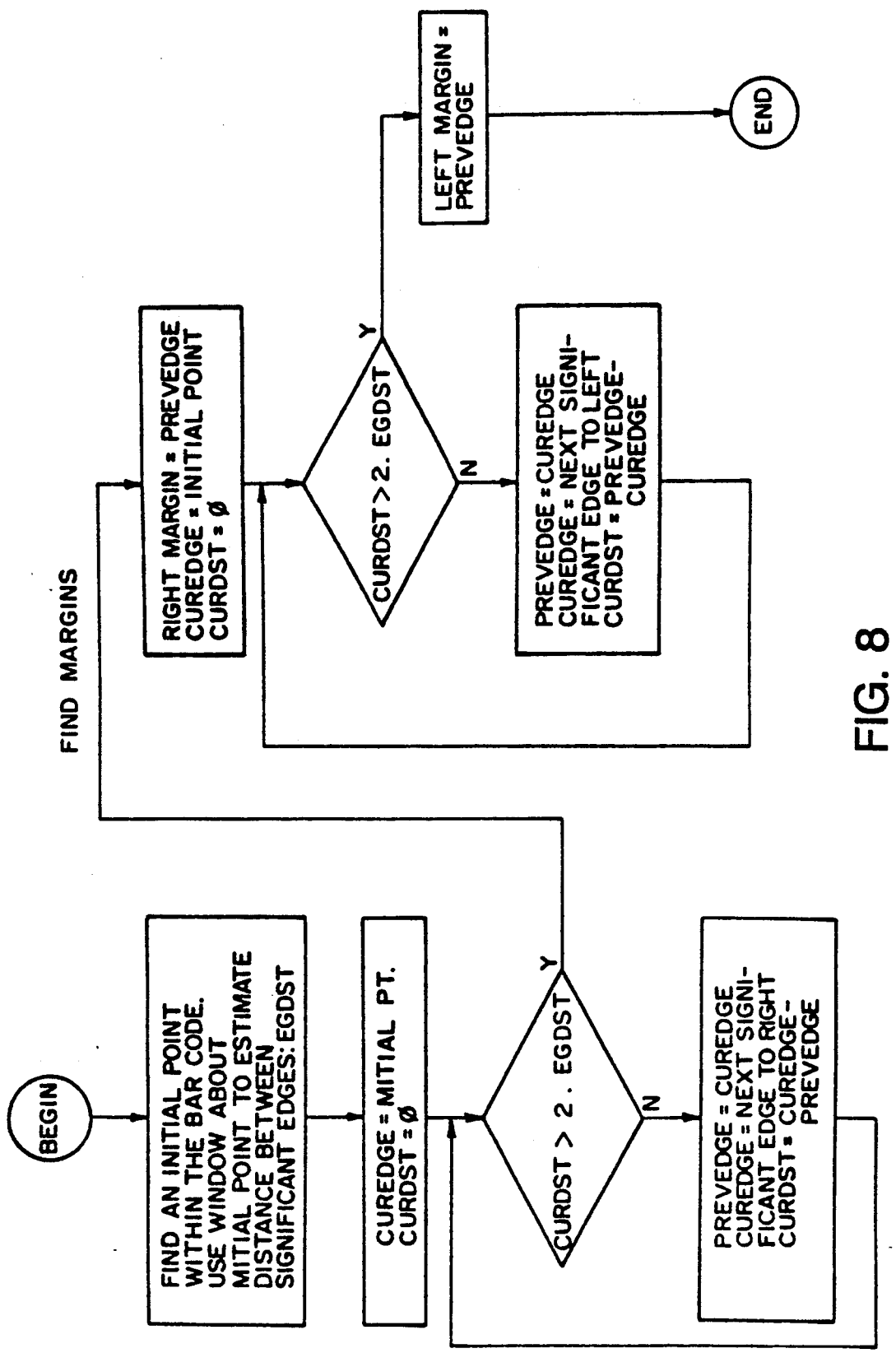
FIG. 8 is a flow chart of a software routine used to find the margins of the analog waveform.

A flow chart of the software routine utilized in the preferred embodiment for finding the left and right margins is provided in FIG. 8. Specifically referring to the flow chart, the initial point found within the bar code is labelled CUREDGE. Using a sample window to the right of this point, the routine determines EGDST which is the maximum distance between significant rising edges in the sample window. The variable CURDST is the current distance between adjacent significant rising edges to the right of the initial point. As the routine searches to the right for the rising edges, the variable CURDST is compared to determine if it is greater than two times the value of EDGST. If this is so, a "dead zone" has been found. Therefore, the last rising edge found (i.e., PREVEDGE) becomes the right margin. The same routine is then implemented for the left side of the initial point for determining the left margin. The margins demarcate the decodable portion of the analog waveform and it does not matter which margin is determined first. Other techniques used to demarcate the decodable portion can be used as well.

The next step of the algorithm utilizes software routines to identify the information carrying features of the decodable portion of the analog waveform. This step consists of several software routines for obtaining a set of waveform descriptors, i.e., the sets of data representative of the features of the analog waveform, that are utilized by the high density decoder 26 for decoding a high density bar code symbol. It is understood that the decodable portion of the analog waveform is first sampled in time to form an array of intensity values. This array is the main data structure representative of the waveform and the sub-sets (arrays) of waveform descriptors will be obtained from this array of intensity values stored in computer memory.

Figure 5:
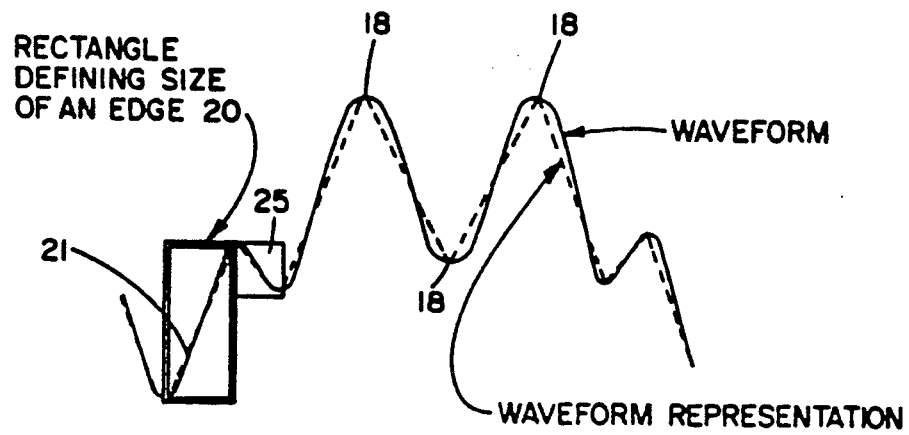
FIG. 5 is an illustration of an analog waveform representative of a high density bar code symbol
Figure 7:
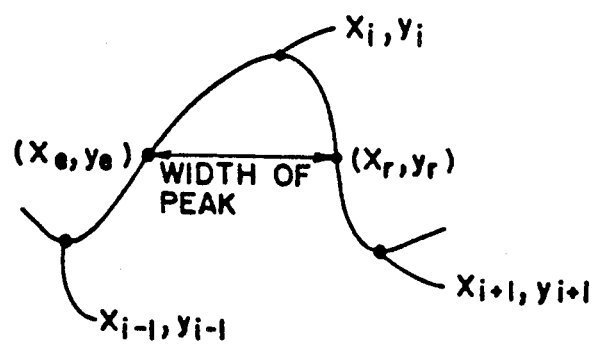
FIG. 7 is an illustration of a low density of waveform extremum width.

The first set of waveform descriptors obtained from the array of intensity values are the extrema locations 18 as shown in FIG. 5. The extrema represent the turning points for the peaks and valleys of the analog waveform as illustrated in FIG. 5. FIG. 5 is a waveform representation of a high density code. Since the peak and valley locations adequately represent a high density waveform, the procedure utilized in the preferred embodiment assigns an extrema to the center of each peak or valley. An extrema point is made up of three parts, i.e., a left portion, a flat or middle region, and a right portion (as shown in FIG. 7). The set of extrema locations obtained are stored in an array.

Figure 9:
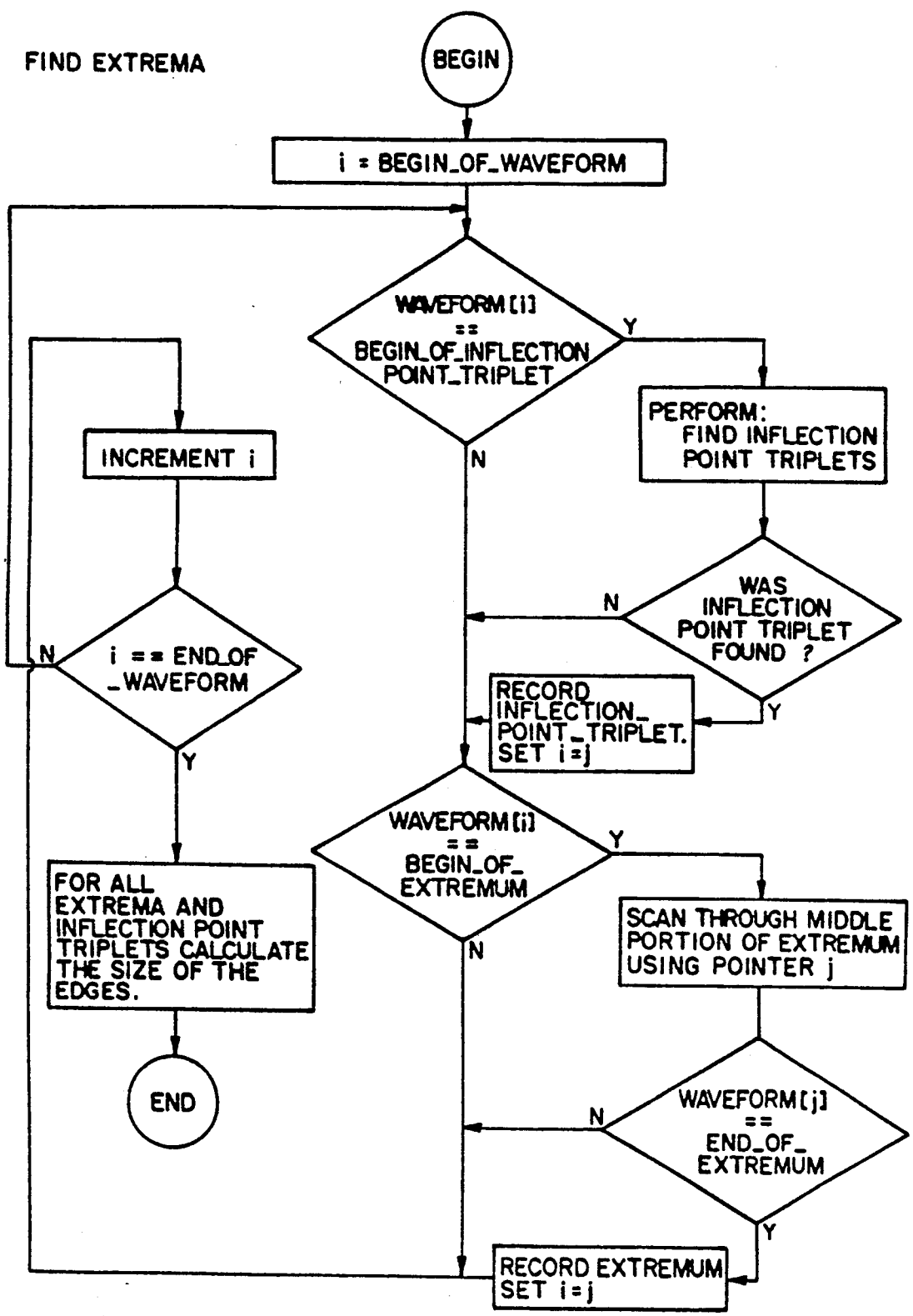
FIG. 9 is a flow chart of a software routine used to find the extrema points of the waveform.

A flow chart of the software routine utilized in the preferred embodiment for finding the extrema locations 18 is provided in FIG. 9. The procedure also incorporates a separate routine for finding inflection point triplets to be described below. These routines can also be implemented separately. The routine scans through every point of the sample array of waveform intensity values, WAVEFORM(i), between the left and right margins to find regions having the successive portions. If these portions are found an extrema is assigned to the center of the middle region. (The variable "i" acts as a pointer when scanning the array of sampled waveform intensity values described above.) In the preferred embodiment, it is first determined whether an inflection point triplet exists at a scanned portion of the waveform. If one does hot, the routine checks to see if an extrema point exists in the manner described above. If an extrema point is so found, it is recorded in an array containing all the extrema locations. Note that the loop is repeated until a margin is reached.

FIG. 5 shows a straight-line approximation of a high density analog waveform. Since this approximation is very good, an array of edge sizes is also obtained as a separate procedure or as part of the procedure for finding extrema locations. This array represents the sizes of the edges that connect adjacent extrema locations. An edge size 20 for decoding purposes is defined as the area of the rectangle that contains the edge 21 as its diagonal. (The edge being the line connecting adjacent extrema.) All that is necessary to obtain the array of edge sizes is to determine, from the array containing extrema locations, the height (intensity) and the distance between successive extrema, for example, the "ith" and "i+1th" extrema locations. The values obtained are simply multiplied to obtain an edge size 20 corresponding to the ith extrema. When this is done for all the extrema between the right and left margins, the array of edge sizes is formed.

Figure 10:
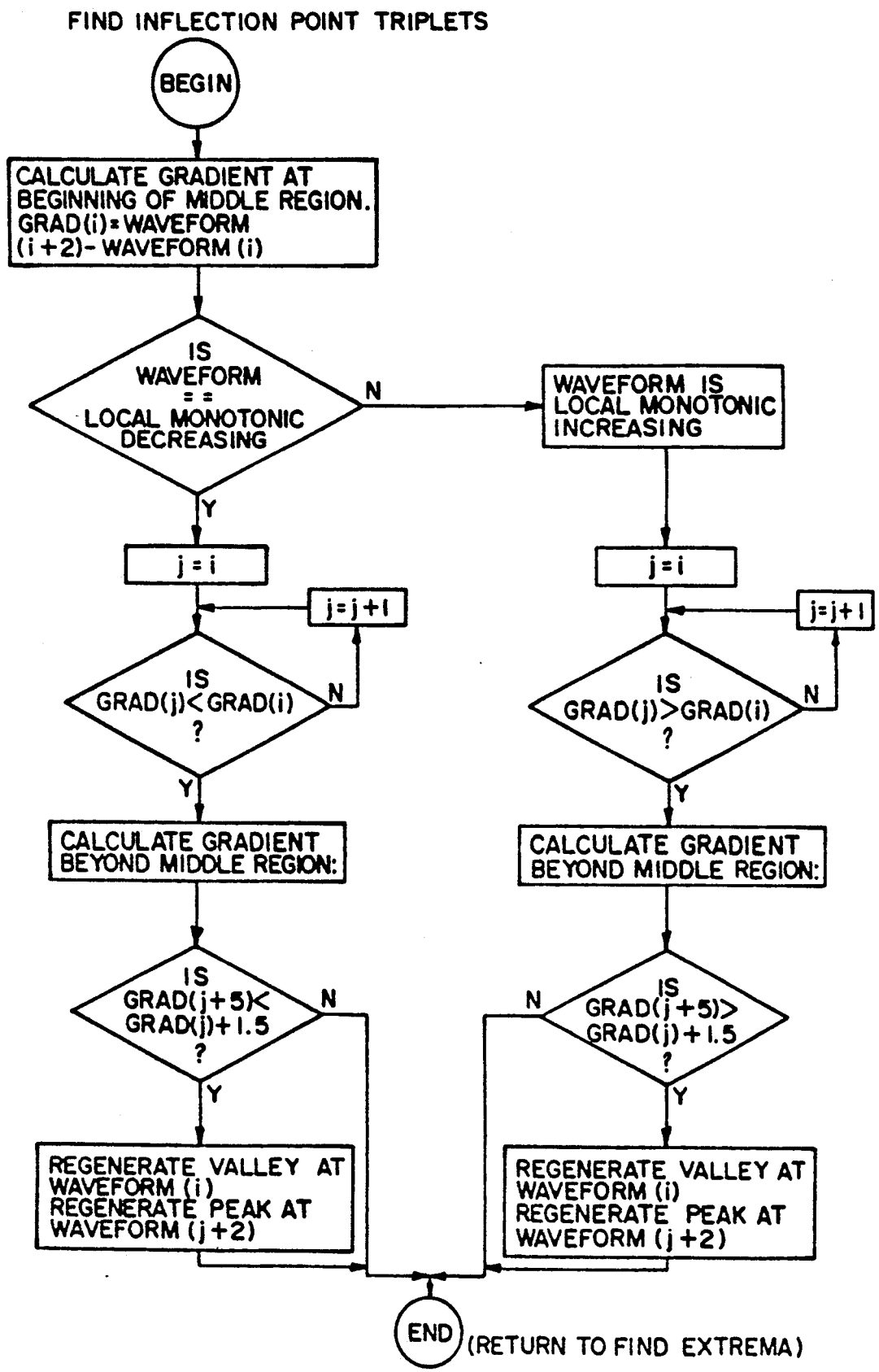
FIG. 10 is a flow chart of a software routine used to obtain the inflection point triplets.

Another characteristic of the analog waveform resulting from the convolution of the laser with a high density symbol, are the formation of inflection point triplets, i.e., the points on a waveform between a successive peak and valley that represent peak and valley combinations that have merged together and disappeared. Such merged peaks and valleys can be recovered with a routine for finding the inflection point triplets of the waveform. A flowchart corresponding to the software routine for locating the inflection points is shown in FIG. 10. Since the inflection point triplets are like extrema in that they are made up of three regions: a steep sloping front region, a gentle sloping middle region, and a steep sloping end region, a similar scan is made through the sampled analog waveform intensity array WAVEFORM(i). Specifically, after a front region is found, the gradient (slope) found at the beginning of the middle region GRAD(i) is calculated. A variable "i" acts as the pointer and it is first determined if the inflection point triplet is monotonic increasing or decreasing depending upon the gradient difference between the front and middle regions. A pointer "j" is then used in determining the extent of the middle region. The middle region is extended until its gradient is less than the initial gradient of the middle region i.e., if GRAD(j) < GRAD(i) for the case of a monotonic decreasing inflection point or, until its gradient is greater than the initial gradient of the middle region, i.e., if GRAD(j) > GRAD(i) for the case of a monotonic increasing inflection point. Once the extent of the middle region is found, the gradient is calculated a distance into the end region for e.g., at GRAD(j+5) and is compared to the gradient at the end of the middle region at GRAD(j) to ensure it is greater by a certain value for, e.g., 1.5 in the preferred embodiment. If the end portion does not meet this criteria, the routine ends and is returned to the find extrema routine as shown in FIG. 9. If the criteria for an inflection point triplet is met, a waveform valley is regenerated at WAVEFORM(i) and a waveform peak is regenerated at WAVEFORM(j+2). The high density decoder 26 can then treat the centers of the regenerated peaks and valleys as additional extrema locations 18. The procedure then returns to the find extrema routine.

The means for obtaining waveform descriptors 16, is not limited to just determining the extrema locations, edge sizes and inflection point triplets. For instance, the low density model is not concerned with the area beneath a peak or valley but is concerned with the width of the peaks or valleys corresponding to widths of the bars/spaces of the symbol. Therefore, a routine for finding the extrema widths of the peaks/valleys can be implemented at the time extrema locations are found, or one can be implemented at the time a low density decode attempt is made as shown in step 34 in FIG. 3. An illustration showing an extrema width for a low density waveform peak is shown in FIG. 7. The routine utilized for finding the extrema width of a peak and valley necessitates the determination of the center of the peak or valley, i.e., its extrema location.

A general routine for finding extrema widths utilized in the preferred embodiment will now be explained with reference to FIG. 7. Basically, the geometric formulas for finding the horizontal distance between two points on a curve is used. The formulas are shown in equations (1a) and (1b) and all "x" and "y" coordinates are obtained from the array of extrema locations.

$$Y_r = (Y_{i+1} + Y_i)/2 \quad Y_1 = (Y_1 + Y_{i-1})/2 \tag{1a}$$

$$X_r = (X_{i+1} + X_i)/2 \quad X_1 = (X_1 + X_{i-1})/2 \tag{1b}$$

Figure 4:
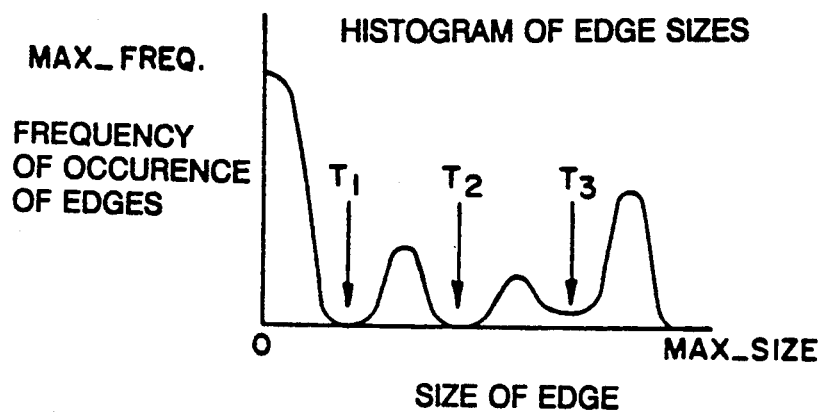
FIG. 4 is a graph showing a histogram of edge sizes.
Figure 11:
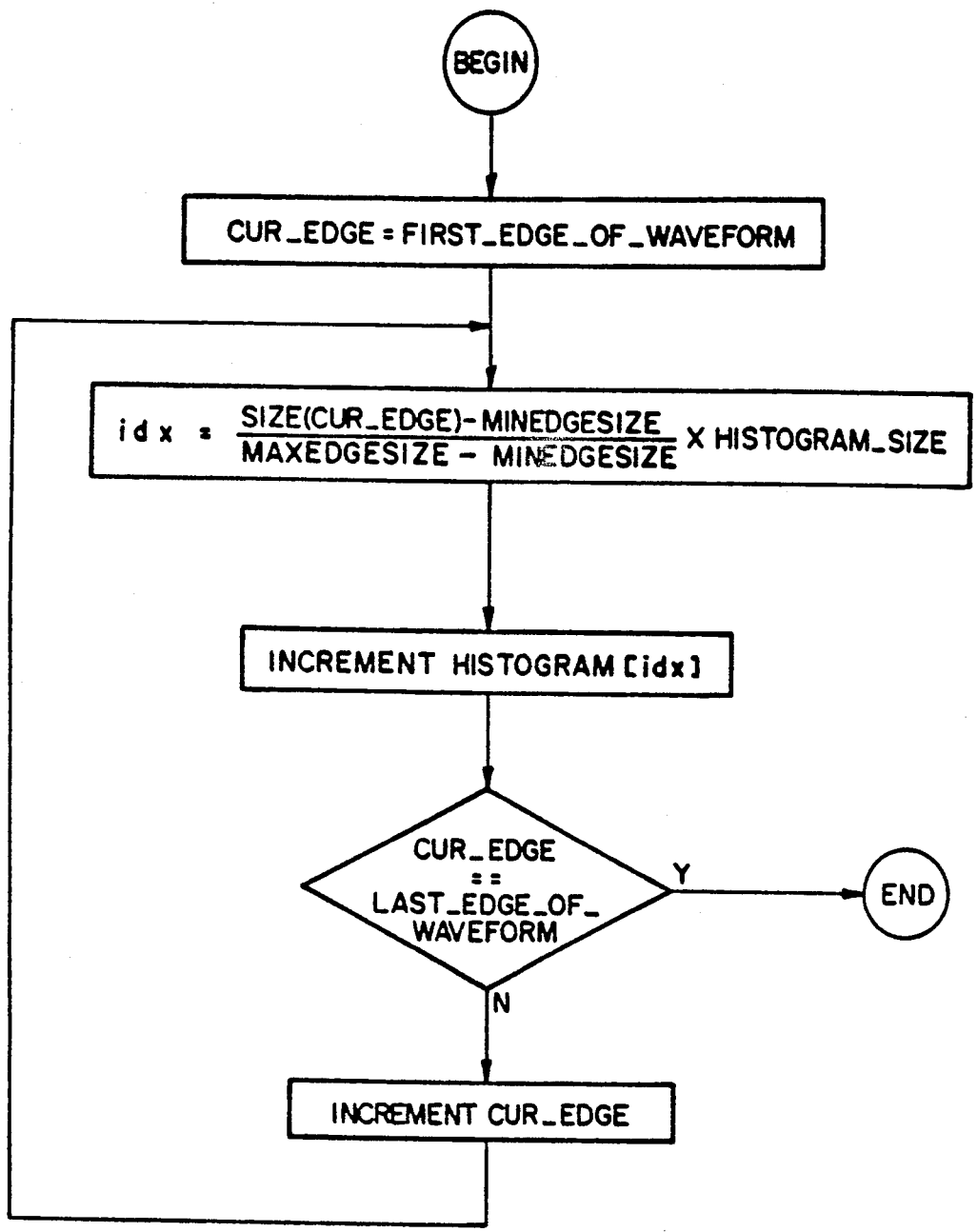
FIG. 11 is a flow chart of a software routine used to obtain the histogram of edge sizes.

In equations (1a) and (1b), $(X_r, Y_r)$ is the midpoint at the right edge of the waveform peak and $(X_1, Y_1)$ is the midpoint at the left edge. Note that $(X_{i-1}, Y_{i-1})$ and $(X_{i+1}, Y_{i+1})$ represent the extrema adjacent to the ith extrema of a particular waveform peak or valley. The horizontal distance $X_r - X_1$ represents the width of the peak/valley. Once the complete set of arrays of waveform descriptors is obtained, the algorithm directs a software routine to form a histogram from the array of the edge sizes. This histogramming step is important because the information obtained therefrom is valuable during low density decoding. Since noise in the analog waveform usually manifests itself as small perturbations riding on the waveform, a guide is needed to separate the small peaks (noise) from the larger peaks (signal). This histogram of the edge sizes 20 performs this function. A software routine for forming the histogram is depicted in the flow chart of FIG. 11. Here, the variable SIZE(cur_edge) signifies a particular edge size from the array of edge sizes that are being histogrammed. The variable "cur_edge" is the pointer. The variables MAXEDGESIZE and MINEDGESIZE respectively indicate the maximum and minimum edge sizes of the edge size array and are used to normalize the histogram. The variable HISTOGRAM_SIZE is used to limit the number of different edge sizes that will be used to form the x-axis of the histogram. For instance, a histogram size of one-hundred is used in the preferred embodiment. The equation assigning a value to the variable IDX calculates a normalized edge size (normalized between values of zero and histogram size). The histogram shown in FIG. 4 suggests possible noise level thresholds that can be removed from the waveform when a low density decode is attempted. FIG. 4 shows a plot of the frequency of occurrence of edges (y-axis) versus the edge sizes (x-axis). The troughs of the histogram labelled $T_1$, $T_2$, and $T_3$ suggest possible noise level threshold values. The noise removal process will be described in further detail below.

The high density decoder 26 is now implemented to decode the bar code symbol. Since the peak and valley areas directly correlate to the size of the bars/spaces in a high density bar code, the high density decoder 26 utilizes the peak/valley areas as the basis for decoding.

Figure 2:
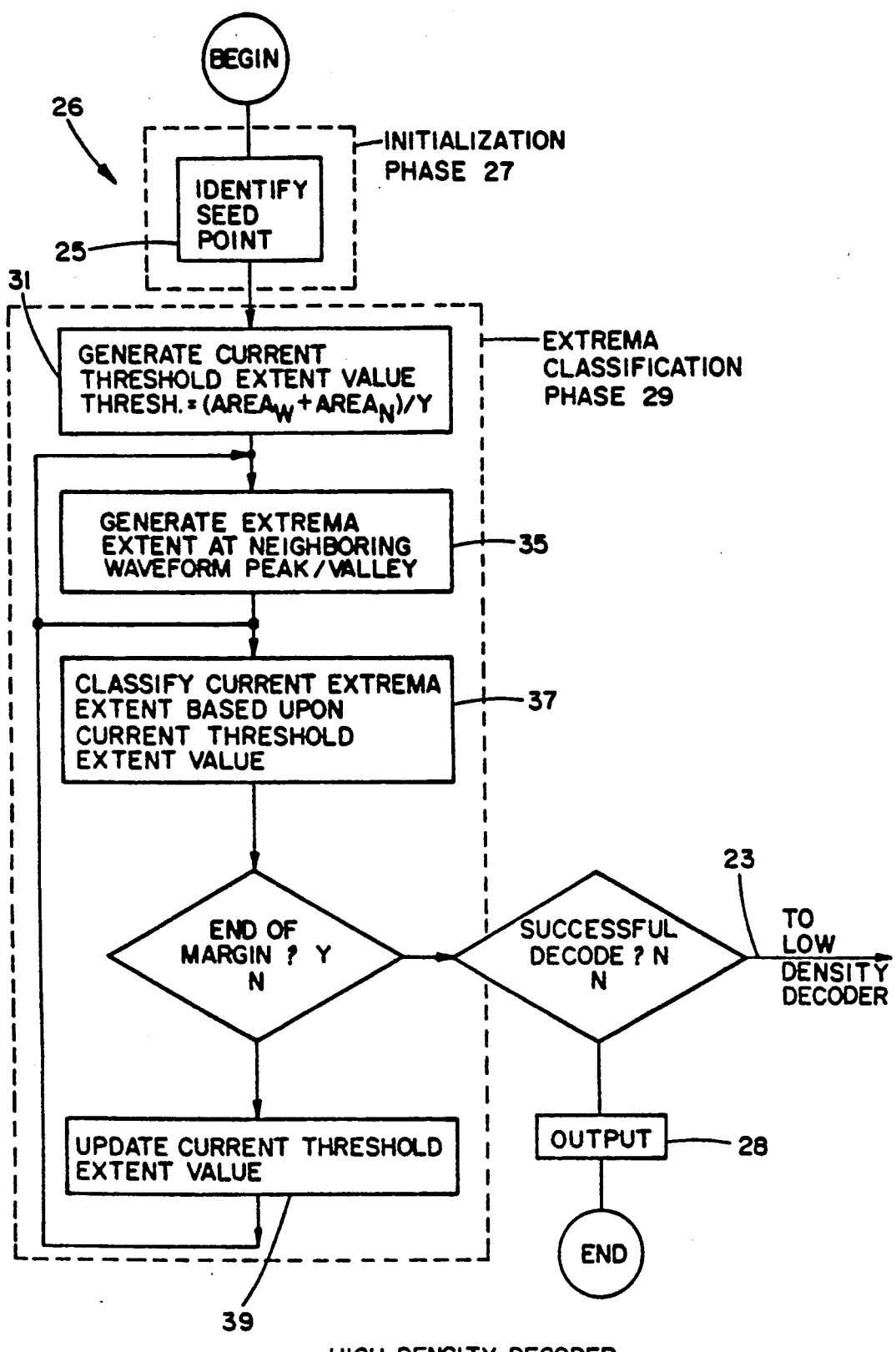
FIG. 2 is a flow chart of a high density decoder of the present invention.

FIG. 2 is a flow chart illustrating the method and algorithm for decoding a high density bar code symbol. The input to the high density decoder consists of a sequence of extrema 18. The algorithm, as implemented by software subroutines, can be broken into distinct phases. The initialization phase 27, consists of identifying the smallest edge size 20 of the input sequence. This is identified as the seed point for the high density decoder. Its adjacent extrema are identified and classified as a narrow-narrow sequence in the bar code. FIG. 5 illustrates a waveform representation for a high density code with a seed point identified as 25.

Figure 6:
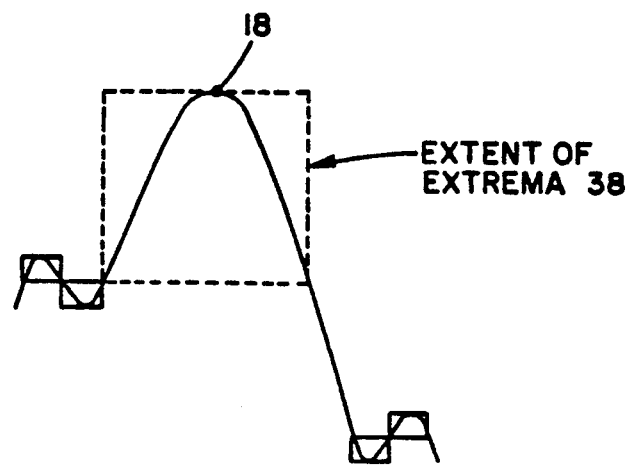
FIG. 6 is an illustration of a high density waveform extremum extent

The next phase is the extrema classification phase 29. In this phase, a software routine first develops an estimate of the size/area of narrow and wide peaks at each extrema location. The size of an extrema, or the extrema extent 38, is related to the area of the bounding rectangle of an extrema point 18. FIG. 6 illustrates an extrema extent 38. It is defined as the area of the largest rectangle that does not overlap the extents of other extrema and such that the extrema point 18 touches one horizontal side of the rectangle and the waveform passes through the corners of the rectangle opposite to the extrema point. Once the seed point 25 is identified the solution is extended to the boundaries of the code. The solution entails classifying each extrema extent 38 that is generated. A threshold technique is utilized to accomplish the classification. A current threshold extent is derived from estimates of the size of wide and narrow extrema shown as step 31 in FIG. 2. For instance, the initial size estimate for a wide extrema, $Area_{wide}$, is the size of the largest edge 20 of the input sequence. The initial size estimate for a small extrema, $Area_{narrow}$, is a half of the size of the smallest edge in the input sequence (the seed point 25). The current threshold extent value is calculated as shown in equation (2).

$$\text{Threshold} = (Area_{wide} + Area_{narrow})/4 \tag{2}$$

Using the extrema extent definition and starting from the seed point 25 the extrema extents of each neighboring extrema are generated and classified in sequence as shown in steps 35 and 37 in FIG. 2. The extrema extent is generated and compared to the current threshold extent value generated from step 31 and which is updated in step 39. If the generated extrema extent 38 is greater than the current threshold extent value, it is classified as wide. If the extrema extent 38 is smaller than the current threshold extent value, it is classified as narrow. The classification step is shown as step 37 in FIG. 2.

The high density decoder 26 is an adaptive decoder in that the estimates used to derive the current threshold extent value (step 31) are updated as the solution grows away from the seed point 25. That is, the value of an extrema extent 38 that has been classified as wide or narrow in step 37, is used to decide the size of its neighboring extrema. Therefore, the size of $Area_{wide}$ or $Area_{narrow}$ will be updated as the solution extends outward to the boundaries. The step for updating the threshold extent value is shown as step 39 in FIG. 2. If a small extrema experiences considerable distortion (growth) due to a large extrema two elements away, the current threshold extent value can be artificially increased to compensate for the distortion effects. For instance, equation (3) shows a modified current threshold extent value used to compensate for distortion effects.

$$\text{Threshold} = (\text{Area}_{wide} + \text{Area}_{narrow})/3 \quad (3)$$

Note that the sequence 35 to 39 in FIG. 2 is repeated for each extrema extent until the boundaries of the waveform are reached.

Other schemes for determining and updating a current threshold extent value may be implemented. For example, it is possible to generate all extrema extents 38 first and subsequently classify each instead of generating and classifying each extrema extent one at a time. Either way, at the point when the high density decoder 26 determines that the margins of the waveform have been reached, the decoder 26 has classified each of the sequence of extrema that were input. A look-up table is then used to decode the sequence. If a successful decode is obtained, a signal representative of the decoded symbol is generated, outputted, and the algorithm ends. If the high density decode attempt is unsuccessful, the high density decoding sequence can be implemented again with the assumption that the regenerated peaks/valleys of the inflection point triplets are not valid extrema points. (In the first decode attempt, the high density decoder assumes they are valid extrema points.) The second high density decode attempt is shown as being implemented during the backtracking routine illustrated in FIG. 12 and explained in detail below.

It should be noted that the decoding scheme described above is equivalent to deblurring the waveform and then decoding it by conventional means, i.e., low density decode.

Figure 3:
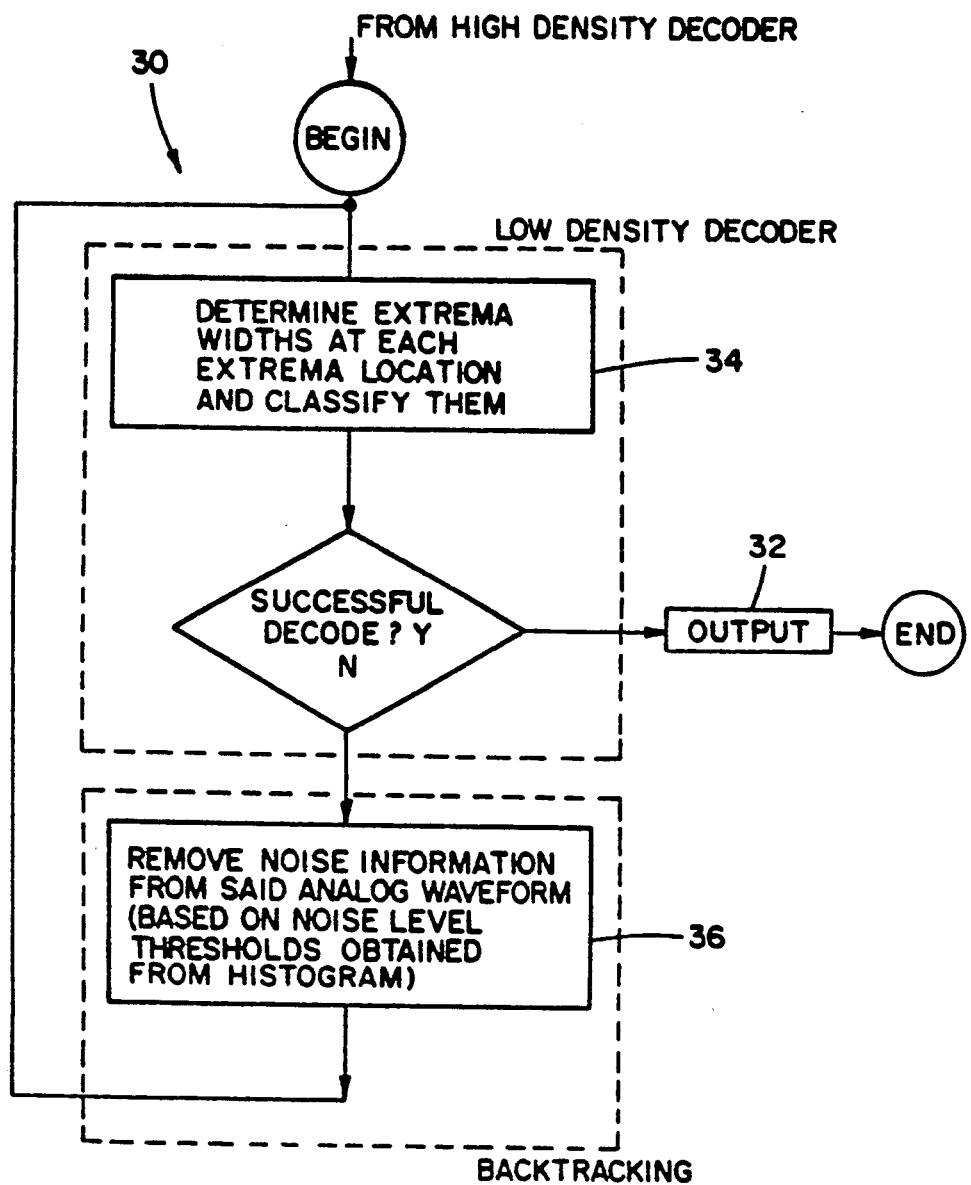
FIG. 3 is a flow chart of a low density decoder of the present invention.

If the decoding attempts by the high density decoder 26 fail, a non-decode signal 23 is generated to trigger the low density decoder 30. A characteristic of the analog representation of a low density symbol is that its extrema height information is corrupted (usually by dot-matrix noise), while the width information is basically intact. The extrema areas are therefore distorted so the low density decoding process only makes use of width information to classify the extrema. A software subroutine implementing the formulas set forth in equations (1a) and (1b) described above, can be used to determine the extrema widths. In the low density model, the inflection point triplets are not used in determining extrema widths. The sequence of extrema widths, and not the extrema themselves, are passed to the low density decoder 30. Each of the sequence of widths are then classified as wide or narrow and a look-up table is used to decode the sequence. FIG. 3 is a flow chart for the low density decoder 30. Determining and classifying extrema widths at each extrema location is shown as step 34. If a successful decode is obtained, a signal representative of the decoded symbol is generated, outputted, and the algorithm ends. If the low density decode attempt is unsuccessful, another attempt is made with new assumptions about the noise levels. This is the backtracking routine shown as step 36 in FIG. 3 and detailed in the flow chart of FIG. 12.

In backtracking, the algorithm is directed to change its assumptions about noise, reprocess the data, and attempt another low density decode. The assumptions are usually concerned about the peaks and valleys that are due to noise and should be removed from the analog waveform. Although there are many backtracking schemes, the one in the preferred embodiment involves removing noise from the whole analog waveform. The troughs $T_1$, $T_2$, and $T_3$ of the histogram of FIG. 4 suggest possible noise level threshold values. Any edges 20 above the noise threshold are considered to be significant edges, and those below are considered to be due to noise. For example, if the noise level threshold suggested by $T_1$ of FIG. 4 is applied, edge sizes 20 below that threshold are merged into their larger edge neighbors. Then another low density decode attempt is made. If this decoding attempt fails, the algorithm is again directed to remove edges below a second noise level threshold; for e.g. the one suggested by trough $T_2$ in the histogram 24 of FIG. 4. Then another decode attempt is made with the noise removed. This technique of removing noise information from the analog waveform as suggested by the histogram of edge sizes is successively applied until the noise level to be removed becomes 50% of the largest edge in the waveform.

Figure 12:
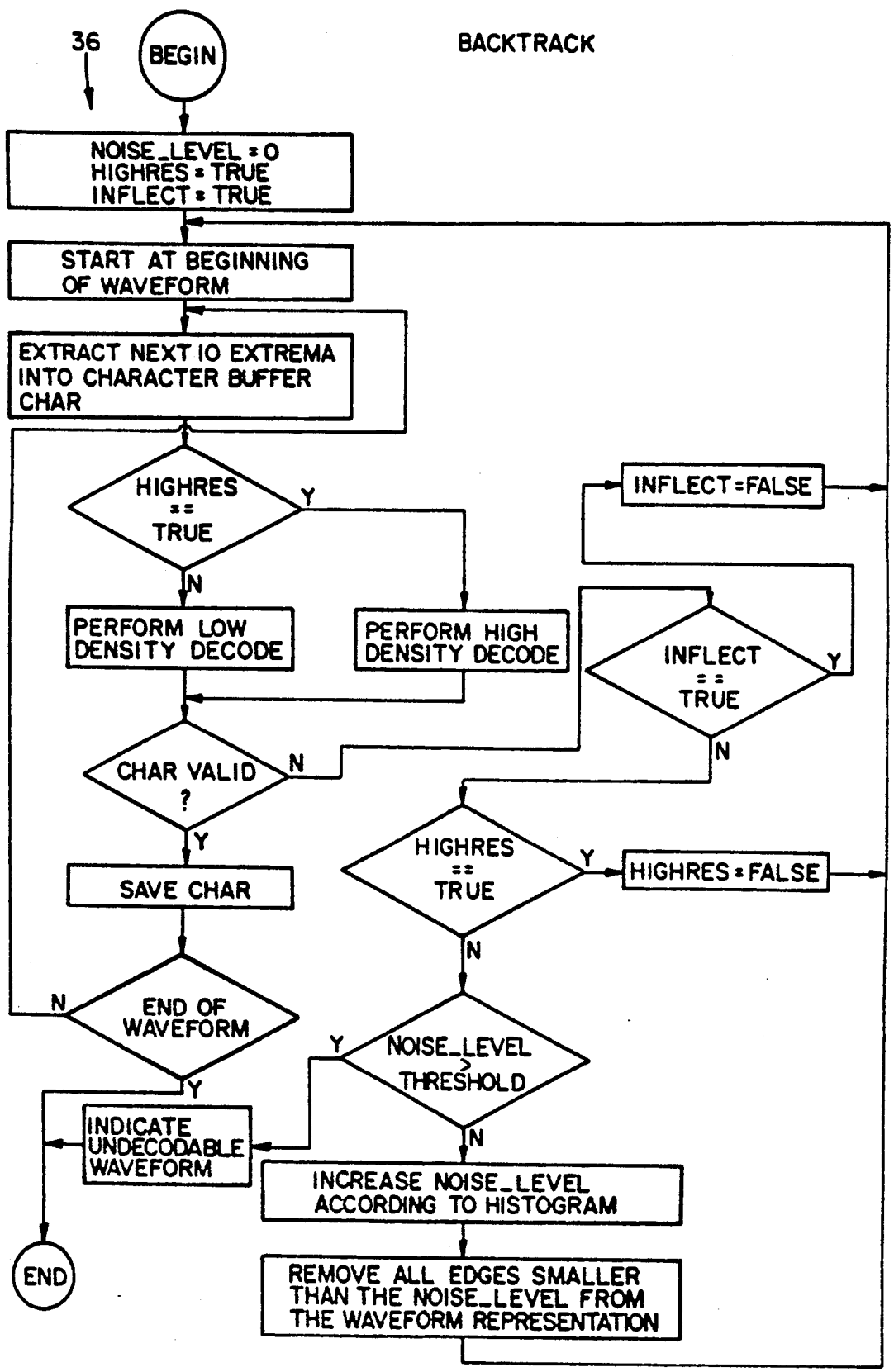
FIG. 12 is a flow chart of a software routine used for backtracking.

In the backtracking routine of FIG. 12, the noise level is initialized to 0 and the flags HIGHRES and INFLECT are set to true to indicate that all extrema points and inflection points are assumed valid. HIGHRES, when true, means the decode will be attempted by the high density decoder 26. When false, it means the standard low density decoder 30 is used. The algorithm first directs ten extrema points at a time to be entered into a character buffer CHAR. If the points entered are valid, i.e., decodable, then the loop continues until a margin is reached. If the entered extrema points in CHAR are not valid, the INFLECT flag is set false and another high density decode attempt is made starting from the beginning of the waveform. When INFLECT is false, only the extrema points and not the inflection points are entered into the buffer. If the next decode attempt is successful, the loop is repeated for the next ten extrema points. If the CHAR buffer is not valid, the HIGHRES flag is now set to false and the whole algorithm is repeated again except that the standard decoder, the low density decoder 30, is utilized. If a low density decode attempt is made with unsuccessful results, a determination is made to see if the noise level is greater than a threshold level. If so, the waveform is undecodable and an output is made to so indicate. If the noise level is less than the threshold, the noise level is increased according to the histogram of FIG. 4, and all the waveform edges smaller than the noise level suggested by the histogram are removed from the waveform representation as described above. The whole process is then repeated again with the new noise level.

Figure 13:
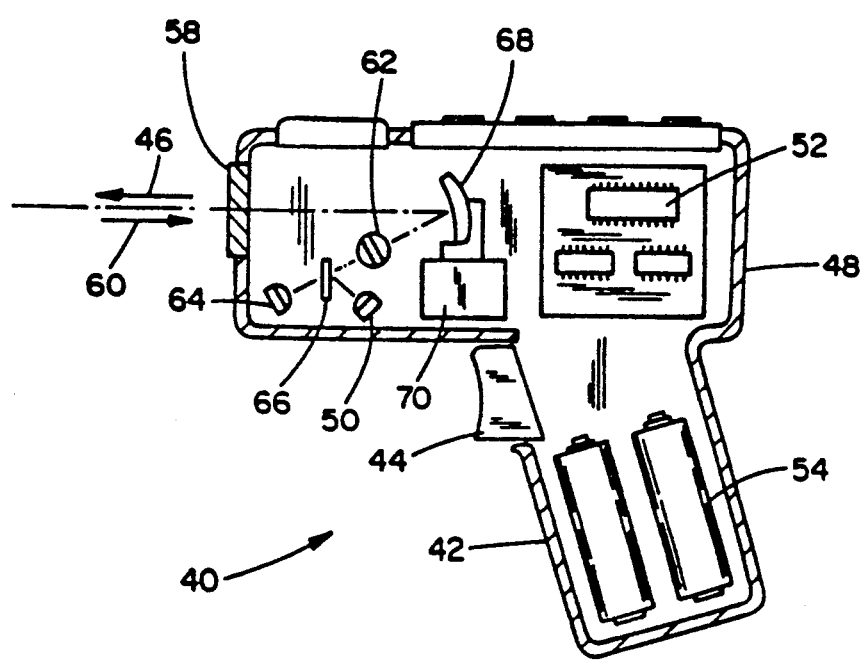
FIG. 13 is an illustration of a laser scanning gun.

The present invention may be implemented in a hand-held, laser-scanning bar code reader unit such as illustrated in FIG. 13, although in the preferred embodiment, the algorithm software is located remotely from the laser scanning reader unit. This allows for the easy implementation of changes to the software and/or to the look-up table data base. In a preferred embodiment, the reader unit 40 is a gun-shaped device, having a pistol-grip type of handle 42 and movable trigger 44, employed to allow the user to activate the light beam 46 and detector circuitry when pointed at the symbol to be read, thereby saving battery life if the unit is self-powered. A lightweight plastic housing 48 contains the laser light source, the detector 50, the optics and signal processing circuitry, and the CPU 52, as well as power source or battery 54. A light-transmissive window 58 in the front end of the housing 48 allows the outgoing light beam 46 to exit and the incoming reflected light 60 to enter. The reader 40 is designed to be aimed at a bar code symbol by the user from a position in which the reader 40 is spaced from the symbol, i.e., not touching the symbol or moving across the symbol. Typically, this type of hand-held bar code reader is specific to operate in the range of perhaps several inches.

As further depicted in FIG. 13, a suitable lens 62 (or multiple lens system) may be used to focus the scanned beam into the bar code symbol at an appropriate reference plane. A light source 64 such as a semiconductor laser diode is positioned to introduce a light beam into the axis of the lens 62, and the beam passes through a partially-silvered mirror 66 and other lenses or beam-shaping structure, as needed, along with an oscillating mirror 68 which is attached to a scanning motor 70 activated when the trigger 44 is pulled. If the light produced by the source 64 is not visible, an aiming light may be included in the optical system. The aiming light, if needed, produces a visible-light spot which may be fixed, or scanned just like the laser beam; the user employs this visible light to aim the reader unit at the symbol before pulling the trigger 44.

Although the present invention has been described with respect to linear or single bar codes, it is not limited to such embodiments, but may also be applicable to more complex scanning patterns and to stacked or two-dimensional bar codes such as Code 49 and similar symbologies. It is conceivable that the method of the present invention may also find application for use with various machine vision applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly or a more sophisticated data acquisition system.

The module would advantageously comprise a laser-/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

We claim:

1. In a symbol scanning system, an analog waveform decoder that operates directly upon an analog waveform representative of a symbol for decoding information contained in said symbol, said analog waveform decoder comprising:

means for identifying a decodable portion of said waveform;

means responsive to said decodable portion of said waveform for obtaining a plurality of waveform descriptors defining said decodable portion of said waveform;

first decoding means responsive to one or more of said plurality of waveform descriptors for producing a first decode signal representative of information contained in a high density symbol or producing a non-decode signal;

second decoding means responsive to one or more of said plurality of waveform descriptors for producing a second decode signal representative of information contained in a low density symbol in response to said non-decode signal;

means for outputting said first decode signal when said symbol is a high density symbol; and means for outputting said second decode signal when said symbol is a low density symbol, wherein said means for obtaining said plurality of waveform descriptors includes:

a) means for obtaining extrema locations representative of peaks and valleys of said analog waveform;

b) means for determining edge sizes that connect adjacent extrema locations; and c) means for determining inflection point triplets of said analog waveform.

2. The analog waveform decoder as recited in claim 1 wherein said first decoding means includes:

a) means for identifying a seed point from a sequence of said edge sizes;

b) means for generating an extrema extent at each extrema location wherein said extrema extents are generated starting from said seed point and ending at said boundaries;

c) means for classifying the size of each extrema extent.

3. The analog waveform decoder as recited in claim 2 wherein said classifying means includes:

means for determining a current threshold extent having a value based upon one or more generated extrema extents; and means for comparing said current threshold extent value to a generated extrema extent.

4. The analog waveform decoder as recited in claim 3 wherein the means for determining said current threshold extent value includes updating means for changing said current threshold extent value to reflect the size of an extrema extent determined prior to the one being updated.

5. The analog waveform decoder as recited in claim 1 wherein said second decoding means includes means for determining an extrema width of each peak and valley of said waveform from information contained at extrema located at each peak and valley and extrema located adjacent thereto.

6. The analog waveform decoder as recited in claim 5 further including means for generating a histogram of said edge sizes and means for determining noise level thresholds from said histogram.

7. The analog waveform decoder as recited in claim 6 further including means for removing noise information from said analog waveform based upon a noise level threshold obtained from said histogram.

8. The analog waveform decoder as recited in claim 7 further including a backtracking means for returning said analog waveform with noise information removed, into said second decoding means.

9. The analog waveform decoder as recited in claim 1 wherein said first decoding means utilizes only said extrema locations and said edge sizes for decoding the information contained in said high density symbol.

10. The analog waveform decoder as recited in claim 1 further including means for computing high order derivatives of said waveform and for determining zero points of said derivatives.

11. In a symbol scanning system, an analog waveform decoder that operates directly upon an analog waveform representative of a high density symbol for decoding information contained in said high density symbol, said analog waveform decoder comprising:
means for identifying boundaries of said analog waveform to identify a decodable portion of said waveform;
means responsive to said decodable portion of said waveform for obtaining a plurality of waveform descriptors defining said decodable portion of said waveform;
high density decoder means responsive to one or more of said plurality of waveform descriptors for decoding information contained in said high density symbol; and
means for outputting a signal representative of information contained in said symbol,
wherein said means for obtaining said plurality of waveform descriptors includes:
a) means for obtaining extrema locations representative of peaks and valleys of said analog waveform;
b) means for determining edge sizes that connect adjacent extrema locations; and
c) means for determining inflection point triplets of said analog waveform.

12. The analog waveform decoder as recited in claim 11 wherein said high density decoding means includes:
a) means for identifying a seed point from a sequence of said edge sizes;
b) means for generating an extrema extent at each extrema location wherein said extrema extents are generated starting from said seed point and ending at said boundaries; and
c) means for classifying the size of each extrema extent.

13. The analog waveform decoder as recited in claim 12 wherein said classifying means includes:
means for determining a current threshold extent having a value based upon one or more generated extrema extents; and
means for comparing said current threshold extent value to a generated extrema extent.

14. The analog waveform decoder as recited in claim 13 wherein the means for determining said current threshold extent value includes updating means for changing said current threshold extent value to reflect the size of an extrema extent determined prior to the one being updated.

15. The analog waveform decoder as recited in claim 11 wherein said high density decoder means utilizes only said extrema locations and said edge sizes for decoding the information contained in said high density symbol.

16. A method for decoding an analog waveform representative of information contained in a symbol comprising the steps of:
determining boundaries of said analog waveform to identify a decodable portion of said waveform;
processing said decodable portion of said analog waveform to obtain a plurality of waveform descriptors defining said decodable portion of said waveform;
performing a first decoding process on one or more of said plurality of waveform descriptors for producing a first decode signal representative of information contained in a high density symbol or producing a non-decode signal;
performing a second decoding process on one or more of said plurality of waveform descriptors in response to said non-decode signal for producing a second decode signal representative of information contained in a low density symbol; and
outputting said first decode signal when said symbol is a high density symbol and outputting said second decode signal when said symbol is a low density symbol,
wherein the processing step includes the steps of:
obtaining extrema locations representative of peaks and valleys of said analog waveform;
determining edge sizes that connect adjacent extrema locations; and
determining inflection point triplets of said analog waveform.

17. The method for decoding an analog waveform as recited in claim 16 wherein said first decoding process includes the steps of:
identifying a seed point from a sequence of said edge sizes;
generating an extrema extent at each extrema location starting from said seed point and ending at said boundaries;
classifying the size of each extrema extent generated.

18. The method for decoding an analog waveform as recited in claim 17 wherein the classifying step includes the steps of:
determining a current threshold extent having a value based upon one or more generated extrema extents; and
comparing said current threshold extent value to a generated extrema extent.

19. The method for decoding an analog waveform as recited in claim 18 wherein the step of determining a current threshold extent value includes the step of updating said current threshold extent value to reflect the size of an extrema extent determined prior to the one being updated.

20. The method for decoding an analog waveform as recited in claim 16 wherein said second decoding process includes the step of determining an extrema width of each peak and valley of said waveform from information contained at extrema located at each peak and valley and extrema located adjacent thereto.

21. The method for decoding an analog waveform as recited in claim 20 further including the steps of generating a histogram of said edge sizes and determining noise level thresholds from said histogram.

22. The method for decoding an analog waveform according to claim 21 further including the step of removing noise information from said analog waveform based upon a noise level threshold obtained from said histogram.

23. The method for decoding an analog waveform as recited in claim 22 further including the steps of returning said analog waveform with said noise information removed, into said low density decoder means.

24. The method for decoding an analog waveform as recited in claim 16 wherein said first decoding process includes the step of utilizing only said extrema location and said edge sizes for decoding information contained in said symbol.

25. A method for decoding an analog waveform representative of information contained in a high density symbol comprising the steps of:
determining boundaries of said analog waveform to identify a decodable portion of said waveform;
processing said decodable portion of said analog waveform to obtain a plurality of waveform descriptors defining said decodable portion of said waveform;
performing a high density decoding process on one or more of said plurality of waveform descriptors for producing a decode signal representative of information contained in said high density symbol; and
outputting said signal representative of information contained in said symbol,
wherein said processing step includes the steps of:
obtaining extrema locations representative of peaks and valleys of said analog waveform;
determining edge sizes that connect adjacent extrema locations; and
determining inflection point triplets of said analog waveform.

26. The method for decoding an analog waveform as recited in claim 25 wherein said high density decoding process step includes the steps of:
identifying a seed point from a sequence of said edge sizes;
generating an extrema extent at each extrema location starting from said seed point and ending at said boundaries; and
classifying the size of each extrema extent generated.

27. The method of decoding an analog waveform as recited in claim 26 wherein said classifying step includes the steps of:
determining a current threshold extent having a value based upon one or more generated extrema extents; and
comparing said current threshold extent value to a generated extrema extent.

28. The method for decoding an analog waveform as recited in claim 27 wherein the step of determining a current threshold extent value includes the step of updating said current threshold extent value to reflect the size of an extrema extent determined prior to the one being updated.

29. In a symbol scanning system, an analog waveform decoder that operates directly upon an analog waveform representative of a symbol for decoding information contained in said symbol, said analog waveform decoder comprising:
means for identifying a decodable portion of said waveform;
means responsive to said decodable portion of said waveform for obtaining a plurality of waveform descriptors defining said decodable portion of said waveform;
first decoding means responsive to one or more of said plurality of waveform descriptors for producing a first decode signal representative of information contained in a high density symbol or producing a non-decode signal;
second decoding means responsive to one or more of said plurality of waveform descriptors for producing a second decode signal representative of information contained in a low density symbol in response to said non-decode signal;
means for outputting said first decode signal when said symbol is a high density symbol; and
means for outputting said second decode signal when said symbol is a low density symbol,
wherein said symbol is a bar code symbol, and said decoder further includes a means responsive to said plurality of waveform descriptors for deblurring said decodable portion of said waveform and for obtaining an additional set of descriptors that define successive edges of said bar code.

30. The analog waveform decoder as recited in claim 29 wherein said second decoding means is additionally responsive to said additional set of descriptors for producing a decode signal representative of information obtained in a bar code symbol.

31. A decoder comprising: means receptive of an analog signal having a waveform representative of a decodable symbology and including a decodable portion; means for locating the decodable portion of the waveform; means for producing a plurality of waveform descriptors relating to edge sizes of the decodable portion of the waveform; and means for decoding information contained in the decodable symbology in response to the descriptors.

32. The decoder according to claim 31, wherein the means for decoding comprises means for producing a histogram of the edge sizes of the decodable portion of the waveform.

33. A method of decoding comprising the steps of: receiving an analog signal having a waveform representative of a decodable symbology and including a decodable portion; locating the decodable portion of the waveform; producing a plurality of waveform descriptors relating to edge sizes of the decodable portion of the waveform; and decoding information contained in the decodable symbology in response to the descriptors.

34. The method according to claim 33, wherein the step of decoding comprises producing a histogram of the edge sizes of the decodable portion of the waveform.

35. A system for reading and decoding symbology comprising: a light source; means for directing light from the light source on a decodable symbology; means receptive of reflected light from the symbology for producing an analog signal having a waveform representative of the decodable symbology and including a decodable portion; and decoding means receptive of the analog signal for decoding the symbology and comprising means for locating the decodable portion of the waveform, means for producing a plurality of waveform descriptors relating to edge sizes of the decodable portion of the waveform and means for producing a decode signal representative of information contained in the decodable symbology in response to the descriptors.

36. The system according to claim 35, wherein the means for producing the decode signal comprises means for producing a histogram of the edge sizes in the decodable portion of the waveform.

37. A method for reading and decoding symbology comprising the steps of: directing a light from a light source on a decodable symbology; receiving reflected light from the symbology to produce an analog signal having a waveform representative of the decodable symbology and including a decodable portion; and decoding the symbology by locating the decodable portion of the waveform, producing a plurality of waveform descriptors relating to edge sizes of the decodable portion of the waveform and producing a decode signal representative of information contained in the decodable symbology in response to the descriptors.

38. The method according to claim 37, wherein the step of producing the decode signal comprises producing a histogram of the edge sizes in the decodable portion of the waveform.

* * * * *